United States Patent [19]

Diau

[11] Patent Number: 5,132,833
[45] Date of Patent: Jul. 21, 1992

[54] LASER SCANNING SYSTEM

[75] Inventor: Golden Diau, Hsinchu, Taiwan

[73] Assignee: Industrial Technology Research Institute, Hsinchu, Taiwan

[21] Appl. No.: 550,174

[22] Filed: Jul. 9, 1990

[51] Int. Cl.$^5$ .......................................... G02B 26/08
[52] U.S. Cl. .................................. 359/221; 359/196; 359/198; 359/212
[58] Field of Search ........................... 350/6.1–6.91; 250/234–236, 237 G; 346/76 L, 108, 110; 369/196–226, 896

[56] References Cited

U.S. PATENT DOCUMENTS

| | | | |
|---|---|---|---|
| 4,525,024 | 6/1985 | Tatsuno et al. | 350/6.5 |
| 4,829,342 | 5/1989 | Nishimura | 250/237 G |
| 4,891,799 | 1/1990 | Nakano | 350/6.3 |

FOREIGN PATENT DOCUMENTS

| | | | |
|---|---|---|---|
| 979695 | 12/1975 | Canada | 350/6.7 |
| 74511 | 6/1980 | Japan | 350/6.6 |
| 103563 | 8/1980 | Japan | 350/6.6 |
| 22415 | 3/1981 | Japan | 350/6.1 |
| 34511 | 2/1984 | Japan | 350/6.6 |
| 246011 | 10/1987 | Japan | 350/6.8 |
| 196014 | 8/1989 | Japan | 350/6.7 |

Primary Examiner—Bruce Y. Arnold
Assistant Examiner—Thong Nguyen
Attorney, Agent, or Firm—Cushman, Darby & Cushman

[57] ABSTRACT

A laser scanning system is provided to include a laser scanning component for generating a laser beam; a pivotable reflecting mirror disposed for receiving and reflecting the laser beam generated by the laser scanning component, and adapted to be driven to pivot between a first position and a second position; a light sensitive drum arranged and configured such that it may receive the laser beam reflected by the reflecting mirror in the first position and it will carry out an image print-out outputting operation by electro-photography technology; a document scanning region adapted to allow an image of a document to be input, and being arranged and configured such that it may allow the document to be scanned by the laser beam reflected to the region by the reflecting mirror in the second position and it may reflect the laser light returned from the document to the laser scanning component; and returned laser light splitting and detecting component disposed in the laser scanning component, for splitting the returned laser light from the laser beam originally generated by the laser scanning component and for detecting an image signal represented by the returned laser light so as to allow an image scanning inputting operation to be carried out.

7 Claims, 4 Drawing Sheets

LASER SCANNING SYSTEM

BACKGROUND OF THE INVENTION

The present invention relates generally to a multi-functional laser scanning system and, more particularly, to a multi-functional laser scanning system which may incorporate the functions of an image scanner, a laser printer, a digital copier and a facsimile machine into a single business machine.

Typically, a laser scanning device in a laser printer provides an image print-out by impinging light and dark dots of light, representing digital data of an image to be printed out, upon a charged light sensitive drum which thus forms thereon a latent image of the image to be printed out. The latent image is then used to produce an image print-out by means of the so-called Chester Carlson cycle of the electro-photography. On the contrary, an image scanner normally carriers out an operation to input an image either by projecting the image of a document through optical lenses upon a charge coupled device (CCD), or by directly reading the image of the document by means of a contact type image sensor. So far, an image outputting device (such as a laser printer) and an image inputting device (such as an image scanner) are independent of each other.

SUMMARY OF THE INVENTION

The primary object of the present invention is to provide a single business machine which incorporates the functions of image inputting and image outputting. The single business machine may serve as a so-called digital copier.

The above-mentioned, conventional laser printer and image scanner have respective optical scanning mechanisms which, however, are of different hardware constructions and carry out different operations. It will be uneconomical to combine the mechanisms of the conventional laser printer and the conventional image scanner together in that the production cost will be high and the combined assembly will occupy a large space. Therefore, the inventor of the present invention aims to provide a novel, multi-functional laser scanning system which may achieve the above-identified object of the present invention.

In accordance with the present invention, a laser scanning system is provided to comprise laser scanning means for generating a laser beam; a pivotable reflecting mirror disposed for receiving and reflecting the laser beam generated by the laser scanning means, and adapted to be driven to pivot between a first position and a second position; a light sensitive drum arranged and configured such that it may receive the laser beam reflected by the reflecting mirror in the first position and it will carry out an image print-out outputting operation when receiving the laser beam; a document scanning region adapted to allow an image of a document to be input, and being arranged and configured such that it may allow the document to be scanned by the laser beam reflected to the region by the reflecting mirror in the second position and it may reflect the laser light returned from the document to the laser scanning means; and returned laser light splitting and detecting means disposed in the laser scanning means, for splitting the returned laser light from the laser beam generated by the laser scanning means and for detecting an image signal represented by the returned laser light so as to allow an image scanning inputting operation to be carried out.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
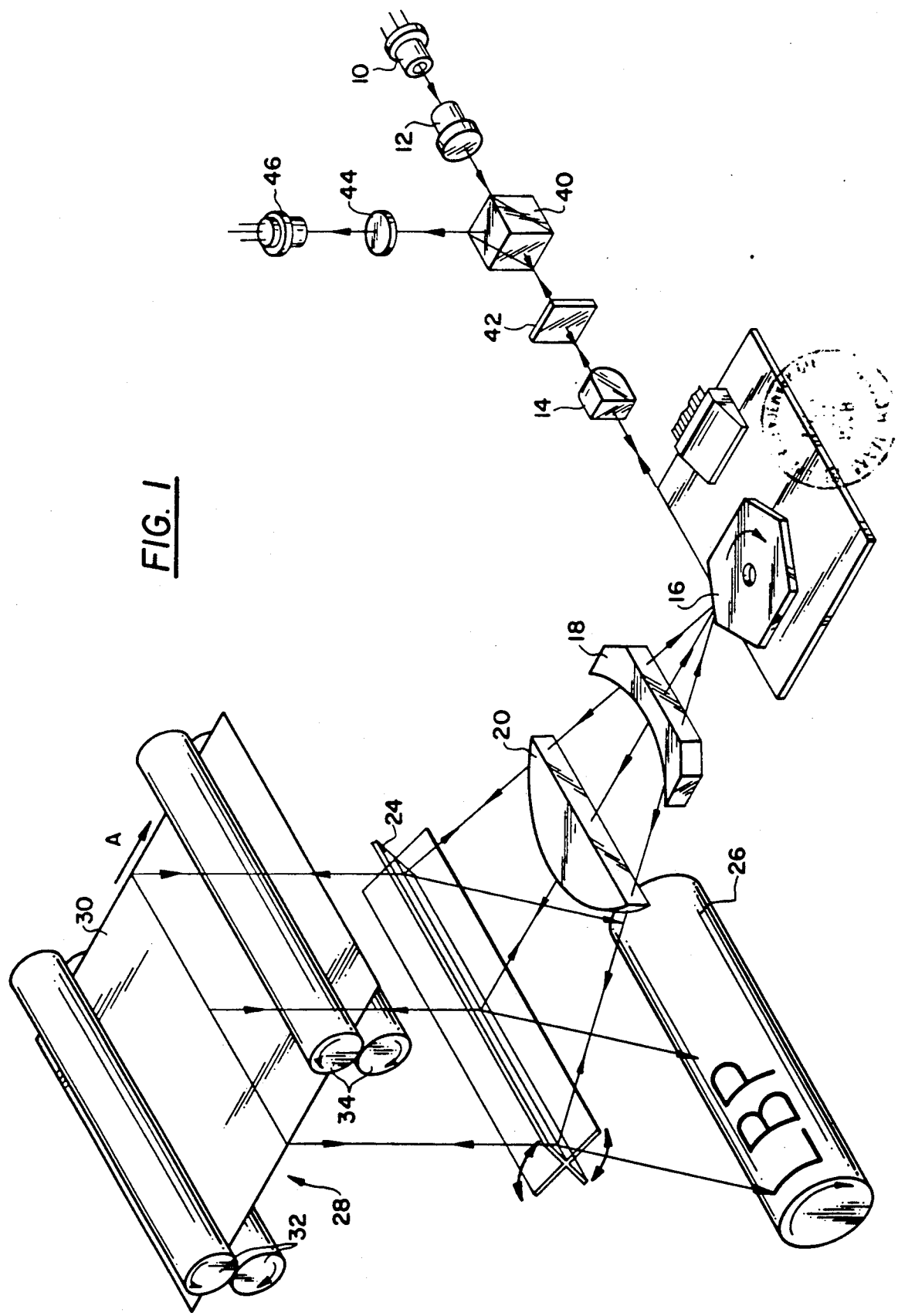
FIG. 1 is a schematic perspective view showing the construction of a laser scanning system according to a first preferred embodiment of the present invention.

Referring now to FIG. 1, a multi-functional laser scanning system according to a first preferred embodiment of the present invention is illustrated to include a semiconductor laser diode 10, a collimating lens 12, a pillar lens 14, a rotary multi-surface lens 16, a pillar lens 18 and an F$\theta$-DEC lens 20. The components 10, 12, 14, 16, 18, and 20 identified above have been conventionally used to form a laser scanning portion of a known laser printer and, therefore, a detailed description in respect thereto is omitted from the disclosure of the present invention. The present invention additionally includes a pivotable reflecting mirror 24 which may be actuated by an actuator 66 (FIG. 5) to pivot along a central longitudinal axis thereof between a first position shown by solid lines in FIG. 1 and a second position shown by dotted lines in FIG. 1. When pivoted to the first position, the mirror 24 will reflect the laser beam impinging thereupon to a light sensitive drum 26 which serves to provide an image print-out according to the reflected laser beam as a conventional laser printer does. When pivoted to the second position, the mirror 24 will reflect the laser beam to a document feed-in region 28 in which a document 30 fed in is clamped by two pairs of rollers 32, 34 and is transferred through the document feed-in region 28 along the direction of an arrow A.

The present invention essentially utilizes a principle that when a beam of light impinges upon an object, the path of the reflected light is reversible and the reflected light may form an image. When a laser beam scans a document 30 fed in, the reflected return laser light may carry signals representing the image on the document 30. According to the preferred embodiment of the present invention, a polarized beam splitter 40 and a quarter wave plate 42 are disposed between the collimating lens 12 and the pillar lens 14 for assuring that a laser beam generated by the laser diode 10 may normally transmit therethrough. The reflected return laser light is refracted by the splitter 40 to a focusing lens 44 which focuses the return laser light on a scan signal sensor or a PIN photodiode 46 which then detects the signals representing the image on the document 30. An image scanning input operation is completed thereby as described above.

Figure 5:
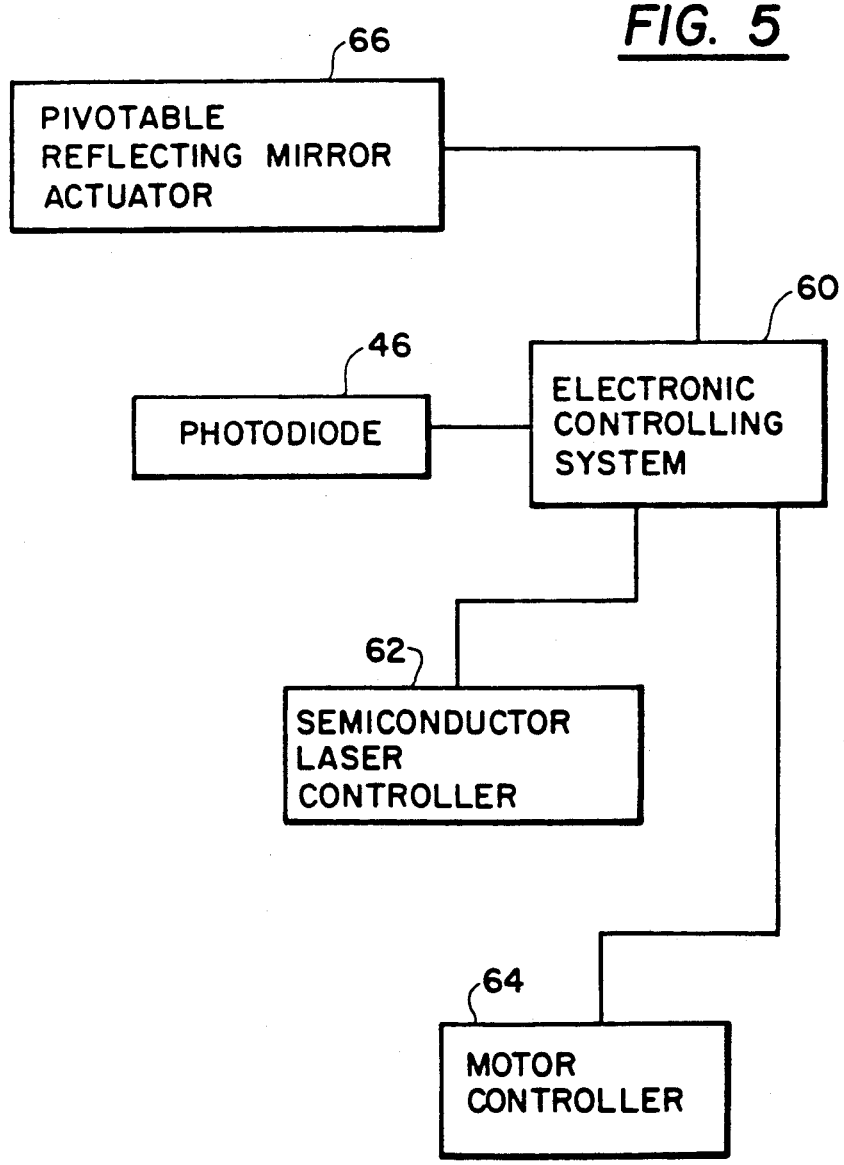
FIG. 5 is a block diagram of a control circuit used in the present invention.

Referring to FIG. 5, a control circuit used in the present invention includes an electronic controlling system 60 and a semiconductor laser controller 62, a motor controller 64, a pivotable reflecting mirror actuator 66 and the photodiode 46, which are all coupled to the electronic controlling system 60. The semiconductor laser controller 62 controls the generation of a laser beam by the laser diode 10. The motor controller 64 controls a DC brushless motor (not shown in the drawings) for driving the rotary movement of the polygon 16. The pivotable reflecting mirror actuator 66 actuates the pivotable reflecting mirror 24 to pivot between the first position and the second position thereof. The actuator 66 may be constructed by utilizing any conventional mechanism which is apparent to one skilled in the art and no further description with regard thereto is included hereinafter. The image signals detected by the photodiode 46 are processed and stored in the electronic controlling system 60.

Figure 4:
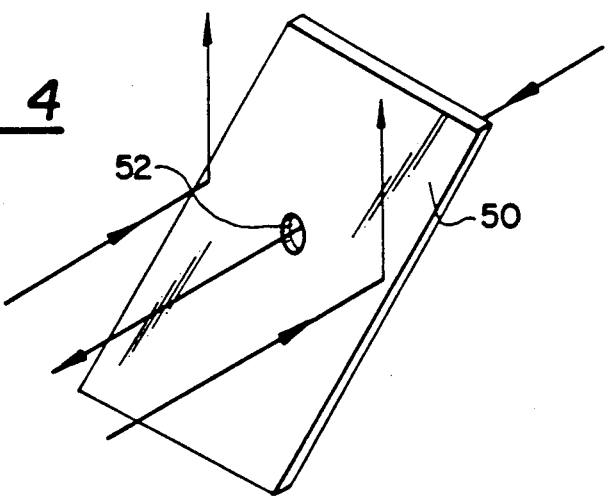
FIG. 4 is a perspective view showing a reflecting mirror constructed according to a preferred embodiment of the present invention.

It should be understood that the combination of the polarized beam splitter 40 and the quarter wave plate 42 provides a return light splitting device, while the combination of the focusing lens 44 and the photodiode 46 provides a return light detecting device. However, an operable return light splitting device is not limited to that shown in FIG. 1. A cube beam splitter or a half mirror may be used instead, while both the image printing out function and the image scanning input function are still supported as well. Furthermore, a reflecting mirror 50 shown in FIG. 4 may be used instead. The reflecting mirror 50 is disposed at a suitable inclining angle and has a through hole 52 provided in a central area thereof. The laser beam generated by the laser diode 10 may pass through the hole 52 while the reflected return beam will be reflected to the focusing lens 44 by the inclining surface of the reflecting mirror 50.

Figure 2:
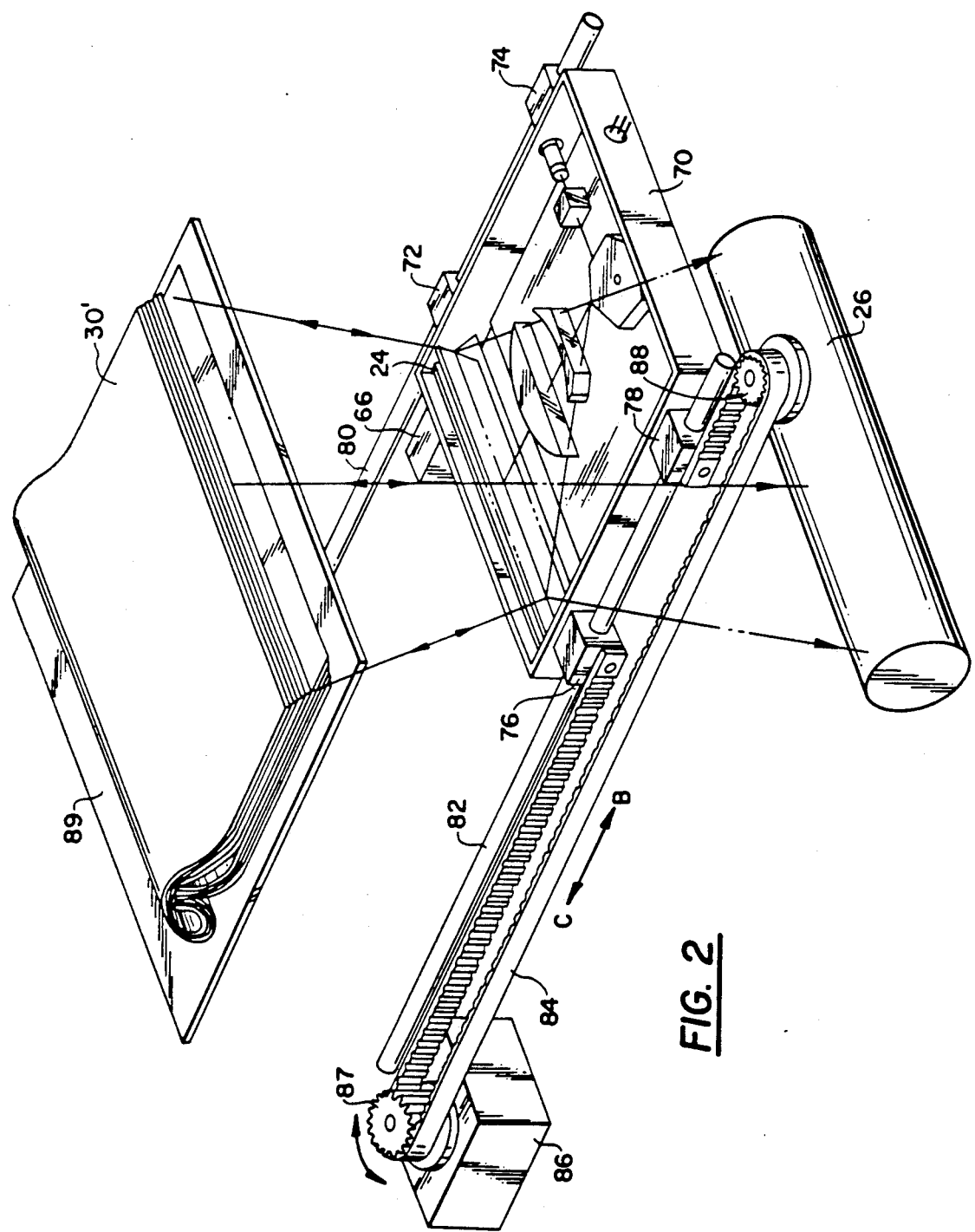
FIG. 2 is a schematic perspective view showing the construction of a laser scanning system according to a second preferred embodiment of the present invention.

Referring to FIG. 2, the laser diode 10, collimating lens 12, polarized beam splitter 40, focusing lens 44, photodiode 46, quarter wave plate 42, pillar lens 14, polygon 16, pillar lens 18, Fθ-DEC lens 20, pivotable reflecting mirror 24 and pivotable reflecting mirror actuator 66 used in the present invention may be arranged and configured into an integral module 70. Along two longitudinal sides of the module 70, two pairs of sliding blocks 72 and 74, 76 and 78 are provided, with each longitudinal side being provided with a pair of sliding blocks. Each of the sliding blocks 72, 74, 76 and 78 has a through hole, each having a central axis parallel to each longitudinal side of the module 70, for allowing one of two guiding rods 80, 82 to insert therethrough so that the module 70 is supported by the guiding rods 80, 82 and is slidable along the guiding rods 80, 82. As shown in FIG. 2, each of the two sliding blocks 76 and 78 at the left longitudinal side of the module 70 respectively holds one of terminal ends of a toothed chain 84 which is driven by an assembly of a step motor 86 and two gears 87, 88 to bring the module 70 to move reciprocally along the directions of arrows B and C. In the present embodiment of the present invention, when serving as a laser printer for providing an image printout, the module 70 may be maintained at a fixed position to direct the laser beam to the light sensitive drum 26. When serving as an image scanner for inputting an image, the module 70 is driven to move along the directions of arrows B and C, as mentioned above, while the document 30' to be scanned is statically laid on a fixed piece of transparent glass plate 89 and is scanned by a laser beam transmitted from the running module 70.

Figure 3:
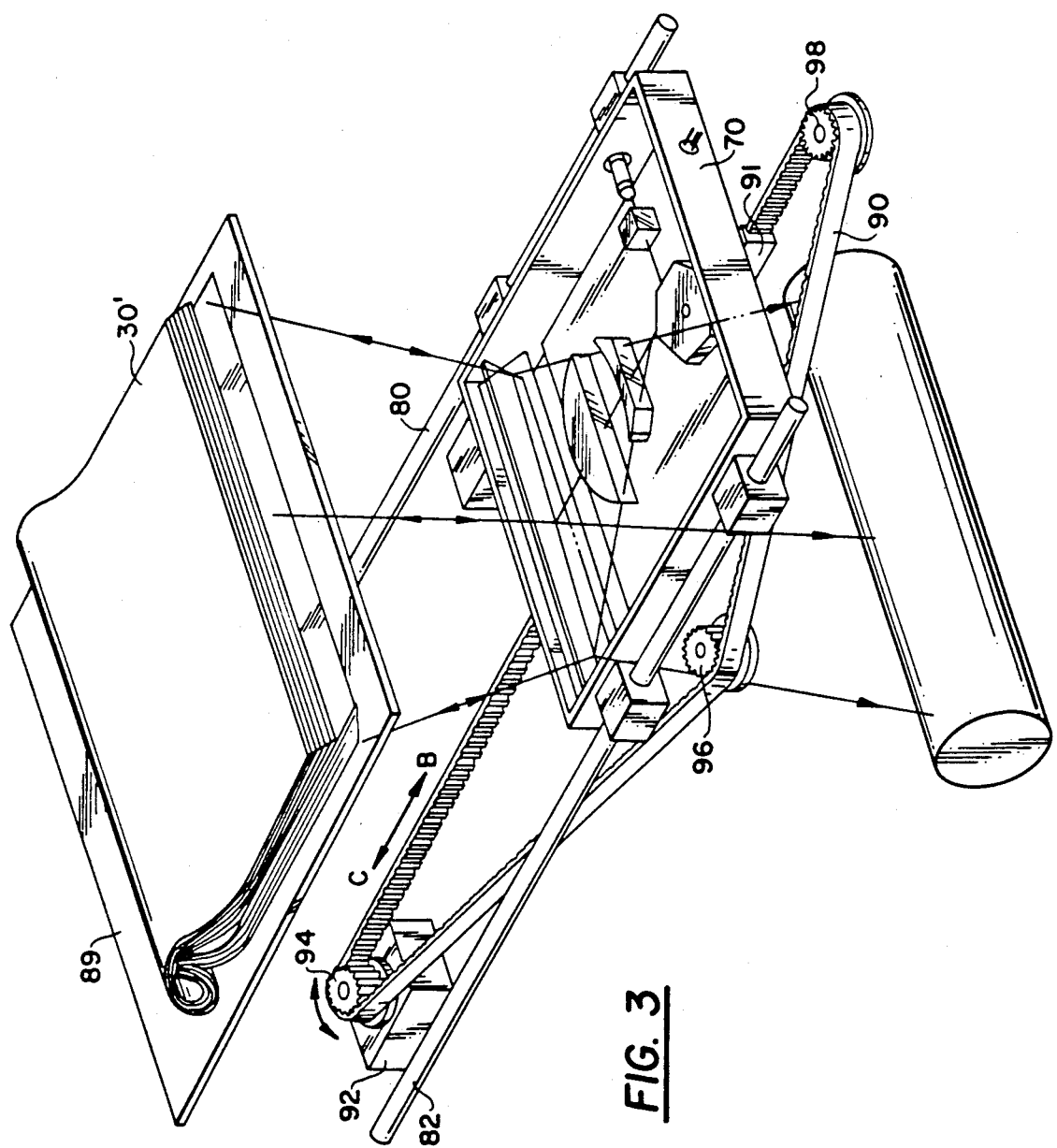
FIG. 3 is a schematic perspective view showing the construction of a laser scanning system according to a third preferred embodiment of the present invention.

It should be understood that the mechanism for driving the module 70 is not limited to that shown in FIG. 2. Any suitable driving mechanism may be adopted by the present invention. One of them has been illustrated in FIG. 3 of the drawings. The terminal ends of a toothed chain 90 are retained by a retaining block 91 provided on the underside of the module 70. The chain 90 is driven by an assembly of a step motor 92 and three gears 94, 96 and 98, in a manner similar to that used by the embodiment shown in FIG. 2, to bring the module 70 to move along the directions of arrows B and C.

According to the constructions described above, the present invention may provide for an image inputting function and an image outputting function by means of a single laser scanning mechanism. The configuration and construction of the present invention have been reduced to their simplest forms so that the scanning system of the present invention may be made at a low cost and will occupy only a small space.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A laser scanning system, comprising:

laser scanning means for generating a laser beam;

a pivotable reflecting mirror for receiving and reflecting said laser beam generated by said laser scanning means, said pivotable reflecting mirror being pivotable between a first position and a second position;

a light sensitive drum for receiving said laser beam reflected by said reflecting mirror positioned in said first position and for carrying out an image print-out outputting operation by electro-photography technology when receiving said laser beam;

a document scanning region, that allows an image of a document to be input, said document scanning region disposed so that the document is scanned by said laser beam reflected to said region by said reflecting mirror positioned in said second position and disposed so that said laser beam reflected from the document is returned to said laser scanning means at the same time the document is scanned; and returned laser light splitting and detecting means, disposed in said laser scanning means, for splitting said returned laser beam and for detecting an image signal represented by said returned laser beam so as to allow an image scanning inputting operation to be carried out;

wherein said laser scanning means, said pivotable reflecting mirror and said returned laser light splitting and detecting means are incorporated into a module;

and wherein said document scanning region includes a fixed piece of transparent glass plate for allowing the document to be statically laid upon said piece of glass plate; and wherein said laser scanning system further comprises a module driving mechanism for reciprocally driving said module so that the document is scanned when the image scanning inputting operation is carried out, and for holding said module stationary at a predetermined position so that said laser beam reflected by said reflecting mirror in said first position is directed to and received by said light sensitive drum when the image print-out outputting operation is carried out.

2. A laser scanning system as claimed in claim 1, wherein said pivotable reflecting mirror has a rectangular profile and is arranged and configured such that it may be driven to pivot along a central longitudinal axis thereof, said reflecting mirror being inclining downward when being pivoted to said first position and being inclining upward when being pivoted to said second position.

3. A laser scanning system as claimed in claim 1, wherein said returned laser light splitting and detecting means comprises a beam splitter for splitting said returned laser light from said laser beam generated by said laser scanning means, a focusing lens and a photodetector, said focusing lens and said photodetector being disposed in the path of said splitted laser light splitted by said beam splitter for focusing and detecting the image signal represented by said splitted laser light.

4. A laser scanning system as claimed in claim 3, wherein said beam splitter comprises a combination of a polarized beam splitter and a quarter-wave plate.

5. A laser scanning system as claimed in claim 3, wherein said beam splitter comprises a cube beam splitter.

6. A laser scanning system as claimed in claim 3, wherein said beam splitter comprises a half mirror.

7. A laser scanning system as claimed in claim 2, wherein said light splitting and detecting means comprises an inclined second reflecting mirror having a through hole provided in a central area thereof, said through hole being arranged and configured to allow said laser beam generated by said laser scanning means to pass therethrough, while said returned laser beam returned from the document to said laser scanning means will be reflected by an inclining surface of said second reflecting mirror outside said central area.

* * * * *